United States Patent
Wei et al.

(10) Patent No.: US 8,085,013 B2
(45) Date of Patent: Dec. 27, 2011

(54) DC POWER CONVERTER AND MODE-SWITCHING METHOD

(75) Inventors: Chun Kai Derrick Wei, Hsinchu County (TW); Kuan-Yeu Chen, Hsinchu Hsien (TW); Hung I Wang, Hsinchu County (TW); Song-Yi Lin, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 510 days.

(21) Appl. No.: 12/249,351

(22) Filed: Oct. 10, 2008

(65) Prior Publication Data
US 2009/0167279 A1    Jul. 2, 2009

(30) Foreign Application Priority Data
Jan. 2, 2008 (TW) .............................. 97100098 A

(51) Int. Cl.
*G05F 1/00* (2006.01)
(52) U.S. Cl. ........................................ 323/269; 323/272
(58) Field of Classification Search .................. 323/269, 323/272
See application file for complete search history.

(56) References Cited

U.S. PATENT DOCUMENTS

| | | | |
|---|---|---|---|
| 5,838,076 A * | 11/1998 | Zarrabian et al. | 307/115 |
| 2002/0121883 A1 * | 9/2002 | Bartenschlager et al. | 323/269 |
| 2005/0189931 A1 * | 9/2005 | Ishino | 323/282 |
| 2006/0164050 A1 * | 7/2006 | Hasegawa et al. | 323/272 |

* cited by examiner

*Primary Examiner* — Jue Zhang
(74) *Attorney, Agent, or Firm* — WPAT, PC; Justin King

(57) ABSTRACT

A DC converter and a mode-switching method used in an electronic apparatus are included. The electronic apparatus includes a subsystem circuit. The DC power converter comprises a first voltage converting circuit electrically connected to the subsystem circuit, receiving a system voltage and a first reference voltage, and converting the system voltage to a first output voltage based on the first reference voltage; and a second voltage converting circuit electrically connected to the subsystem circuit and receiving the system voltage and a second reference voltage, and converting the system voltage to a second output voltage to the same output end of the first voltage converting circuit based on the second reference voltage; wherein the second voltage converting circuit outputs the second output voltage to the subsystem circuit when the first output voltage at the output end is smaller than a threshold.

7 Claims, 5 Drawing Sheets

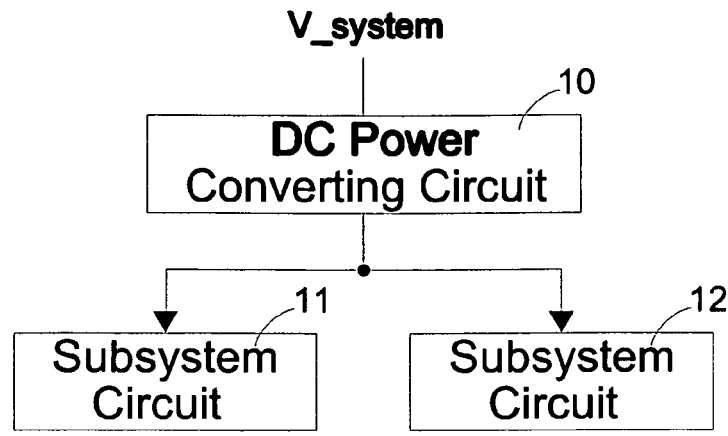
FIG.1 (Prior Art)
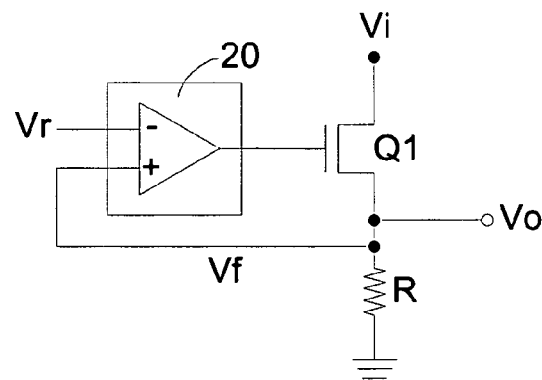
FIG.2-a (Priovr Art)
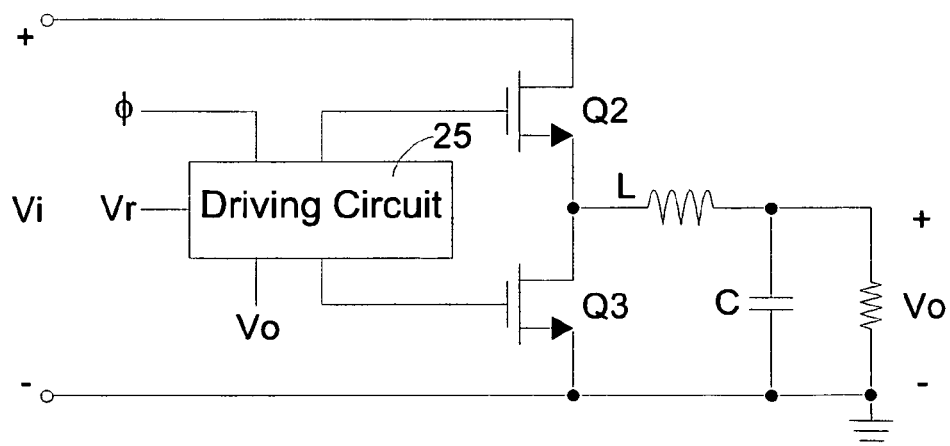
FIG.2-b (Priovr Art)

DC POWER CONVERTER AND MODE-SWITCHING METHOD

FIELD OF THE INVENTION

The present invention relates to a DC power converter and a mode-switching method, and more particularly, to a DC power converter and a mode-switching method used in a portable electronic apparatus.

BACKGROUND OF THE INVENTION

In an electronic apparatus including multiple subsystem circuits, each of the subsystem circuits may require a different DC voltage level from another, and hence there is a need for DC power converters. Referring to FIG. 1 showing a schematic diagram of a structure of a DC power converter applied in an electronic apparatus, a system voltage supply V_system is converted via a DC power converter 10 to generate a first voltage V1 having different voltage levels to be provided to subsystem circuits 11 and 12.

There are two common types of DC power converters; one is the so-called low dropout regulator (LDO). FIG. 2(a) shows a schematic diagram of an LDO circuit including a feedback control circuit 20 for an operational amplifier. The feedback control circuit 20 controls a transisitor $Q^1$ based on comparison between a feedback voltage Vf and a reference voltage Vr, so as to generate an output voltage Vo associated with the reference voltage Vr by lowering an input voltage Vi. such as the foregoing V_system, where Vo=Vr in this example. However, a shortcoming of the above is that, a deducted voltage Vi−V0 is consumed by the transistor Q1, rendering inadequate conversion efficiency. In addition, the conversion efficiency gets even more unsatisfactory as a required output current gets larger. It means that when the load of a system gets larger, power lost becomes more.

The other type of DC power converter is a buck converter as shown in FIG. 2(b). Based on a pulse signal φ, a driving circuit 25 generates a pulse width modulator (PWM) control signal having an operation cycle D to control transistors Q2 and Q3 to obtain a voltage conversion of Vo/Vi=D, with a conversion efficiency thereof reaching as high as 90%, which is better than that of the aforesaid LDO. Therefore, buck converters are generally implemented as the foregoing DC power converter 10.

However, in order to save power in many portable electronic apparatuses that use batteries as a primary power supply, the electronic apparatuses generally will automatically switch from an active mode to a quiescent mode when having been idle for a period of time so as to shut down certain unnecessary circuits to achieve power-saving. In addition, having entered the quiescent mode, the buck converter reduces the reference voltage Vr to shorten the operation cycle D of the PWM control signal to further lower the output voltage thereof. For example, an original 1.2V is reduced to 0.7V, expecting that an object of system power-saving may be achieved. Yet, although the output voltage is lowered, switching operations of the transistors Q2 and Q3 in the buck converter are still persistently performing due to an unchanged frequency of the PWM control signal from the driving circuit 25, such that charging and discharging operations do not come to a cease. As a result, power consumed by the buck converter is not effectively reduced, and power-saving effects are rather disappointing as expected in the quiescent mode.

To overcome the aforesaid drawbacks of prior art, it is a primary object of the invention to effectively reduce power wastage.

SUMMARY OF THE INVENTION

The present invention discloses a DC power converter used in an electronic apparatus having a subsystem circuit. The DC power converter comprises a first voltage converting circuit electrically connected to the subsystem circuit and receiving a system voltage and a first reference voltage and converting the system voltage to a first output voltage based on the first reference voltage; and a second voltage converting circuit electrically connected to the subsystem circuit and receiving the system voltage and a second reference voltage, and converting the system voltage to a second output voltage based on the second reference voltage; the first voltage converting circuit and the second voltage converting circuit connecting to one output end; wherein the second voltage converting circuit outputs the second output voltage to the subsystem circuit when the first output voltage at the output end is smaller than a threshold.

Following the description above, the DC power converter according to the invention further comprises a reference voltage generating circuit for generating the first reference voltage and the second reference voltage for the first voltage converting circuit and the second voltage converting circuit, respectively. Wherein, the first reference voltage is greater than the second reference voltage by a fix value.

Following the description above, in the DC power converter according to the invention, when the first output voltage at the output end being smaller than a threshold, the reference voltage generating circuit pulls down the second reference voltage by a default value per one time cycle until the second output voltage is a predetermined voltage.

Following the description above, in the DC power converter according to the invention, the first voltage converting circuit is a buck converter, and the second voltage converting circuit is a low dropout regulator (LDO).

Following the description above, in the DC power converter according to the invention, the first voltage converting circuit is a first buck converter, and the second voltage converting circuit is a second buck converter.

A mode-switching method used in a DC power converter having a first voltage converting circuit for a high load mode, a second voltage converting circuit for a low load mode, and a reference voltage generating circuit, comprising steps of: providing a system voltage, a first reference voltage and a second reference voltage; first voltage converting circuit generating and outputting a first output voltage to an output end based on the system voltage and the first reference voltage; and the second voltage converting circuit generating and outputting a second output voltage to the output end based on the system voltage and the second reference voltage; wherein, the second voltage converting circuit outputs the second output voltage to the output end when the first output voltage of the first voltage converting circuit is smaller than a threshold.

Following the description above, in the mode-switching method according to the invention, the first reference voltage is greater than the second reference voltage by a fixed value.

Following the description above, in the mode-switching method according to the invention, when the first output voltage at the output end being smaller than a threshold, the reference voltage generating circuit pulls down the second reference voltage by a default value per one time cycle until the second output voltage is a predetermined voltage.

BRIEF DESCRIPTION OF THE DRAWINGS

FIG. 1 is a schematic diagram showing a structure of a DC power converter applied in an electronic apparatus.

FIG. 2(a) is a schematic diagram of an LDO.

FIG. 2(b) is a schematic diagram of a buck converter.

DETAILED DESCRIPTION OF THE PREFERRED EMBODIMENT

Figure 3:
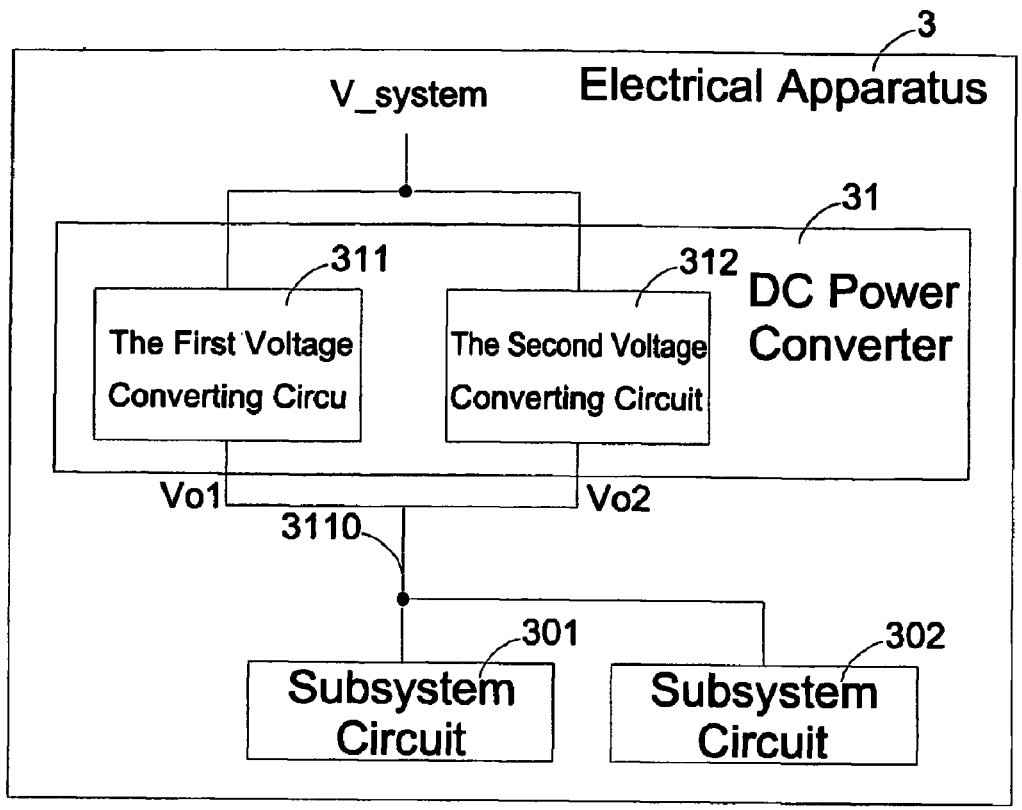
FIG. 3 is a block diagram of a DC power converter according to the invention.

Referring to FIG. 3 showing a block diagram of a DC power converter according to the invention, the DC power converter may be applied in various electronic apparatuses, and more particularly, in portable electronic apparatuses using batteries as power supplies. An electronic apparatus 3 comprises subsystem circuits 301 and 302, and a DC power converter 31 having a first voltage converting circuit 311 and a second voltage converting circuit 312. Wherein, the first voltage converting circuit 311 has higher conversion efficiency for high load, and the second voltage converting circuit 312 is conserving power for low load.

The first voltage converting circuit 311 converts an input voltage from a system voltage V_system to a first output voltage Vo1, which is generated and output by an output end 3110 to the subsystem circuits 301 and 302. The second voltage converting circuit 312 shares the same output end 3110 with the first voltage converting circuit 311, and starts to output a second voltage Vo2 to the output end 3110 in response to the voltage at the output end 3110 being smaller than a threshold Vt. And, the threshold Vt is smaller than the first output voltage Vo1 by a predetermined value Vd, and the second output voltage Vo2 is smaller than or equal to the threshold Vt.

When the electronic apparatus 3 is in an active mode with a high load, the first voltage converting circuit 311 is activated to have the output end 3110 output the first output voltage Vo1 to the subsystem circuits 301 and 302. At this point, the second voltage converting circuit 312 detects that the voltage at the output end 3110 is larger than the threshold Vt; therefore the second voltage converting circuit 312 becomes inactive. Under the active mode, the first voltage converting circuit 311 provides the voltage to the subsystem circuits 301 and 302. However, when the electronic apparatus 3 switches to a quiescent mode with a low load, that the subsystem circuits 301 and 302 no longer require large current and voltage, the first voltage converting circuit 311 is then shut down. At this point, the voltage at the output end 3110 gradually drops until the second voltage converting circuit 312 detects that the voltage at the output end 3110 is smaller than the threshold Vt, then the second voltage converting circuit 312 starts to output the second voltage Vo2 to the output end 3110 to provide the subsystem circuits 301 and 302 with the voltage required. And, when the electronic apparatus 3 returns back to an active mode, the first voltage converting circuit 311 is again activated to generate and output the first output voltage Vo1 to the subsystem circuits 301 and 302 via the output end 3110 output. At this point, the second voltage converting circuit 312 detects that the voltage at the output end 3110 is again larger than the threshold Vt; and therefore the second voltage converting circuit 312 becomes inactive to allow the first voltage converting circuit 311 to provide the subsystem circuits 301 and 302 with the voltage needed. Accordingly, automatic switching between high and low loads is achieved to accomplish the object of power-saving.

Figure 4:
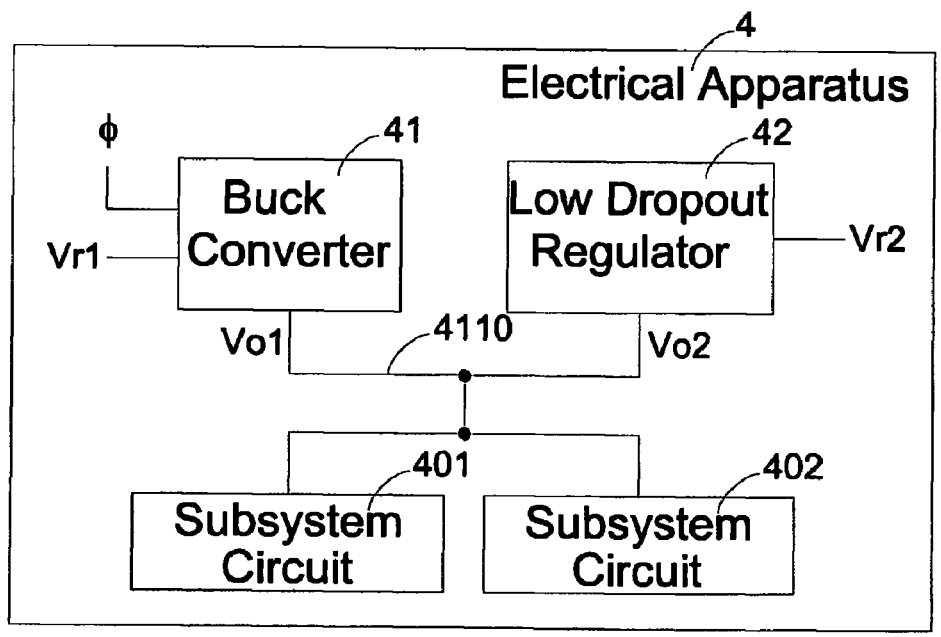
FIG. 4 is a block diagram of a DC power converter according to a first embodiment of the invention.

To better understand technical details of the present invention, a first embodiment according to the invention shall be illustrated with reference to FIG. 4. A buck converter 41 is implemented as the foregoing first voltage converting circuit 311, and an LDO 42 is implemented as the foregoing second voltage converting circuit 312. Circuits of the buck converter 41 and the LDO 42 are as shown in FIGS. 2(a) and 2(b). When an electronic apparatus 4 is in an active mode, the buck converter 41 is activated to output a first output voltage Vo1 at the output end 4110 for the subsystem circuits 401 and 402 based on a first reference voltage Vr1. The first output voltage Vo1 has a linear relationship with the first reference voltage Vr1. At this point, the LDO 42 detects that the voltage at the output end 4110 is larger than the second reference voltage Vr2, which is the foregoing threshold Vt, and therefore the LDO 42 becomes inactive to allow the buck converter 41 to provide the subsystem circuits 401 and 402 with the voltage needed; as shown in FIG. 2(a) wherein the transistor Q1 is switched off. However, when the electronic apparatus 4 enters a quiescent mode where the subsystem circuits 401 and 402 do not require large current and voltage, the buck converter 41 is switched off such as by cutting off the supply of the pulse signal φ. At this point, the voltage at the output end 4110 gradually drops until the LDO 42 detects that the voltage at the output end 4110 is smaller than the second reference voltage Vr2; the LDO 42 then starts to output the second voltage Vo2 to the output end 4110 to provide the subsystem circuits 401 and 402 with the voltage required. For that the second output voltage Vo2 has a linear relationship with the second reference voltage Vr2, and the second output voltage Vo2 is smaller than the first output voltage Vo1 from the buck converter 41, automatic switching is achieved to accomplish the object of power-saving. Vice versa, to again activate the buck converter 41 to output the first output voltage Vo1 for the subsystem circuits 401 and 402, the pulse signal φ is sent to the buck converter 41 to have the LDO automatically shut down as the output voltage increases.

Figure 5:
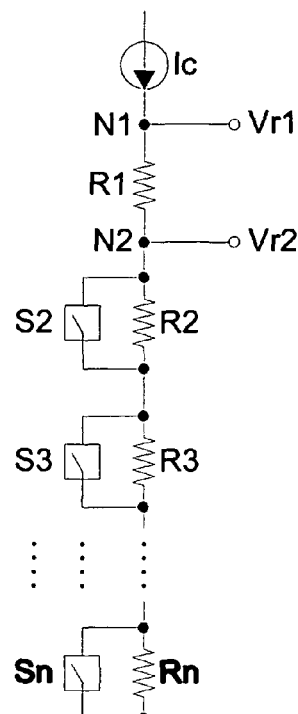
FIG. 5 is a block diagram of a reference voltage generating circuit applicable to the invention.
Figure 6:
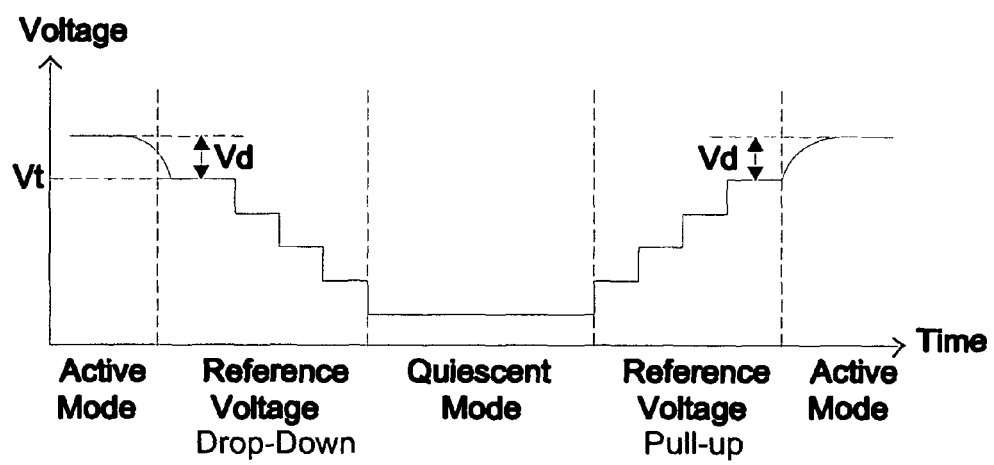
FIG. 6 is a relationship diagram between waveform and mode of voltage change during mode switching according to the invention.

It is to be noted that the aforesaid first reference voltage Vr1 is larger than the second reference voltage Vr2 by a predetermined voltage, so as to ensure automatic switching between the two is completed in a smooth manner while also preventing the LDO 42 from mistakenly outputting the second output voltage Vo2 during an active mode due to mismatch between the buck converter 41 and the LDO 42. Referring to FIG. 5, the FIG. 5 shows a voltage switch providing the first reference voltage Vr1 and the second reference voltage Vr2, a fixed current Ic flows through a plurality of serial resistors R1, R2, R3 ... Rn, and the first reference voltage Vr1 and the second reference voltage Vr2 are derived from a first node N1 and a second node N2, respectively. It is observed from the diagram that Vr1−Vr2=Ic×R1, and therefore Vr1 is larger than Vr2 by a predetermined voltage Ic×R1, such as 100 mv. To accomplish an object of power-saving, each of the controlled switches S2, S3, and S4 ... Sn is connected parallel with each of the R2, R3, and R4 . . . Rn to gradually lower levels of the first reference voltage Vr1 and the second reference voltage Vr2. For example, one controlled switch is connected after a predetermined time cycle T (50 ms, for instance) to simultaneously lower the first reference voltage Vr1 and the second reference voltage Vr2 by a voltage difference (50 mV, for instance), with Vr1−Vr2 remained constant. When all the controlled switches are connected, the LDO 42 operating on the second reference voltage Vr2 is allowed to output a minimum operating voltage such as 0.7V for the subsystem circuits 401 and 402 in a quiescent mode to maintain basic operations while accomplishing the object of power-saving. Vice versa, by switching off one controlled switch at a predetermined time cycle, the first reference voltage Vr1 and the second voltage Vr2 are simultaneously incremented by a voltage difference, with Vr1−Vr2 still remained constant. When all the controlled switches are cut off, the LDO 42 operating on the second reference voltage Vr2 is recovered to a maximum operating voltage. The pulse signal φ is sent to the buck converter 41 for re-activation, and the LDO 42 is automatically switched off when the output voltage increases. FIG. 6 shows a relationship diagram between waveform and mode of the voltage change to better understand the aforesaid description.

Figure 7:
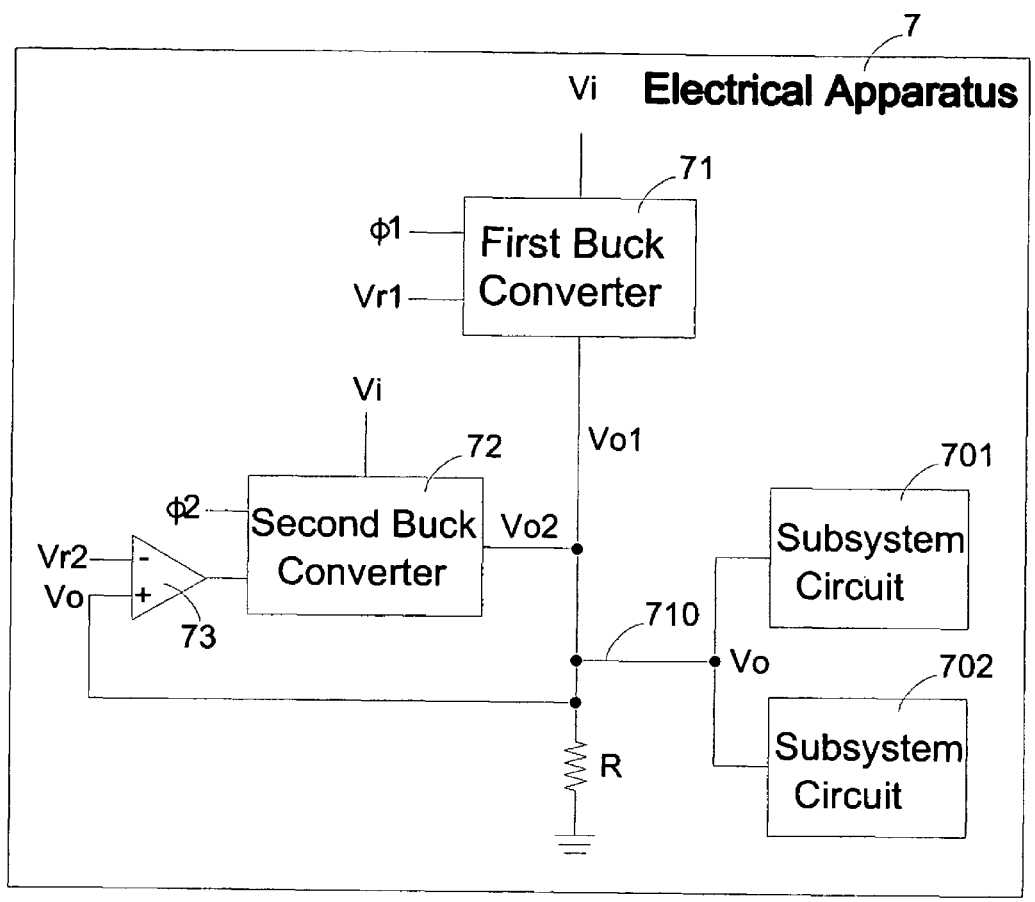
FIG. 7 is a block diagram of a DC power converter according to a second embodiment of the invention.

To more explicitly express technical details according to the invention, a preferred second embodiment shall be described with reference to FIG. 7. A first buck converter 71 is implemented as the foregoing first voltage converting circuit 311, and a second buck converter 72 is implemented as the foregoing second voltage converting circuit 312. When an electronic apparatus 7 is in an active mode, the first buck converter 71 outputs the first output voltage Vo1 at an output end 710 for subsystem circuits 701 and 702 based on the first reference voltage Vr1. The first output voltage Vo1 has a linear relationship with the first reference voltage Vr1. When a comparator 73 detects that a voltage at the output end 710 is larger than the second reference voltage Vr2, the second buck converter 72 stops operating. However, when the electronic apparatus 7 enters a quiescent mode, for that the subsystem circuits 701 and 702 no longer require large current and voltage, the first buck converter 71 is then shut down such as by cutting off the supply of the first pulse signal φ1. At this point, the voltage at the output end 710 gradually drops. When the comparator 73 detects that the voltage at the output end 710 is smaller than the second reference voltage Vr2, a second pulse signal φ2 is activated to have the second buck converter 72 start to output the second output voltage Vo2 to the output end 710 for the subsystem circuits 701 and 702. The second output voltage Vo2 has a linear relationship with the second reference voltage Vr2, and the second output voltage Vo2 is smaller than the first output voltage Vo1, thereby accomplishing the object of power-saving by automatic switching. Vice versa, to again activate the first buck converter 71 to output the first output voltage Vo1 for the subsystem circuits 701 and 702, the first pulse signal φ1 is sent to the first buck converter 71, such that the second buck converter 72 will automatically shut down when the output voltage increases. Thereby, in this embodiment, automatic switching between high and low loads is achieved to accomplish the object of power-saving.

Figure 8:
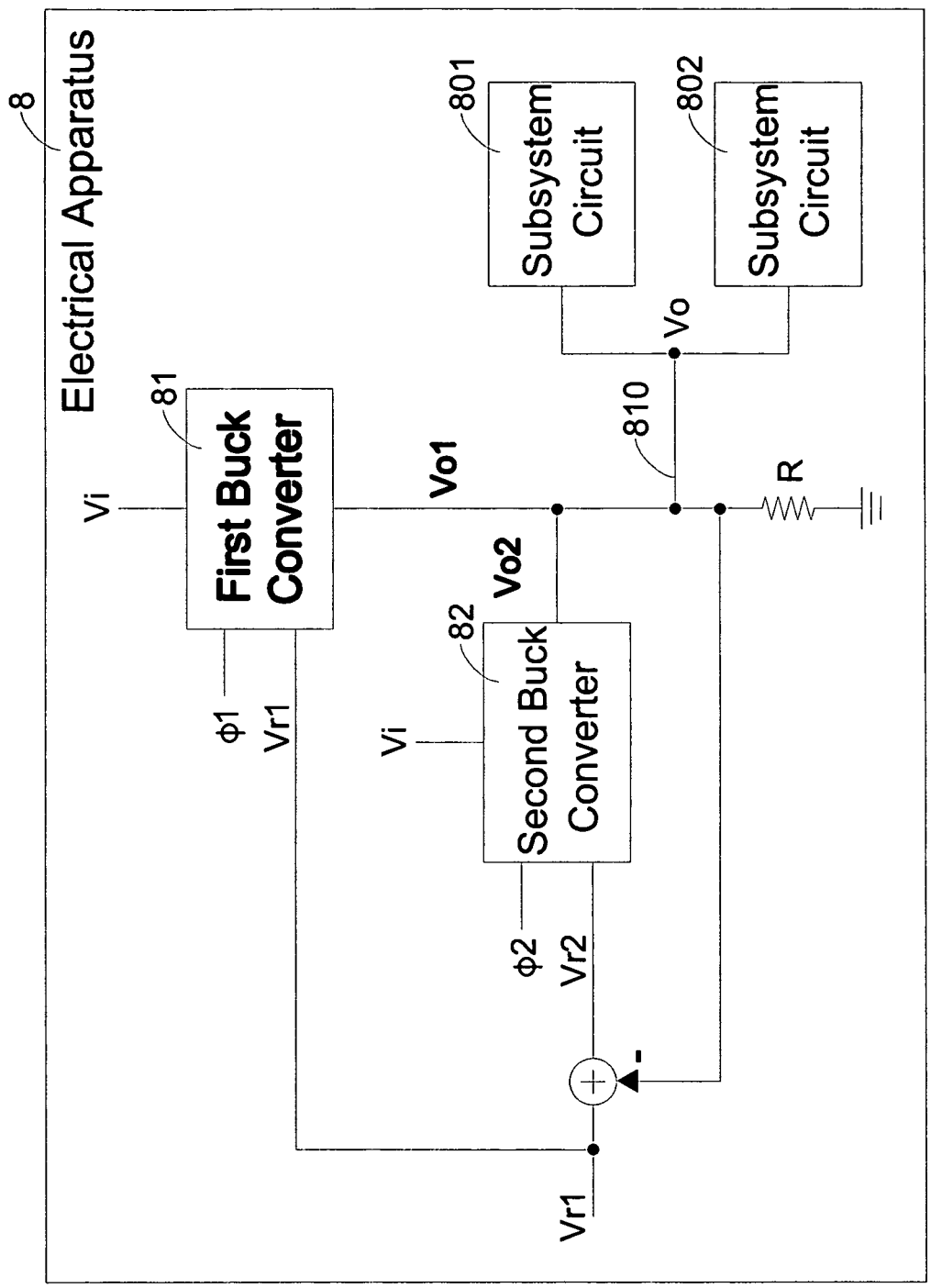
FIG. 8 is a block diagram of a DC power converter according to a third embodiment of the invention.

Referring to FIG. 8, the FIG. 8 shows a third preferred embodiment according to the invention, a first buck converter 81 is implemented as the foregoing first voltage converting circuit 311, and a second buck converter 82 is implemented as the foregoing second voltage converting circuit 312. When an electronic apparatus 8 is in an active mode, the first buck converter 81 outputs the first output voltage Vo1 at an output end 810 for subsystem circuits 801 and 802 based on a first pulse signal φ1. The first output voltage Vo1 has a linear relationship with the first reference voltage Vr1. At this point, using a negative feedback mechanism, the second buck converter 82 detects that the voltage at the output end 810 approaches the first reference voltage Vr1, while the second reference voltage Vr2 approaches zero, such that an operating cycle of the second pulse signal φ2 input to the second buck converter 82 is adjusted to almost zero to nearly stop the second buck converter 82 from operating. However, when the electronic apparatus 8 enters into a quiescent mode, the subsystem circuits 801 and 802 no longer require large current and voltage, the first buck converter 81 is then shut down such as by cutting off the supply of the first pulse signal φ1. At this point, the voltage at the output end 810 gradually drops and the second reference voltage Vr2 starts to increase while an operating cycle of the second pulse signal φ2 of the second buck converter 82 gets larger as well, such that the second buck converter 82 starts to output the second output voltage Vo2 to the output end 810 for the subsystem circuits 801 and 802. The second output voltage Vo2 has a linear relationship with the second reference voltage Vr2, and the second output voltage Vo2 is smaller than the first output voltage Vo1, meaning that a frequency of the second pulse signal φ2 is smaller than that of the first pulse signal φ1, thus also accomplishing the object of power-saving. Vice versa, to again activate the first buck converter 81 to output the first output voltage Vo1 for the subsystem circuits 801 and 802, the first pulse signal φ1 is sent to the first buck converter 81, such that the second buck converter 82 will automatically shut down when the output voltage increases. Thereby, in this embodiment, automatic switching between high and low loads is achieved to accomplish the object of power-saving.

Conclusive from the above, apart from a buck converter and an LDO, a charge pump may also be implemented as the voltage converting circuit. While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A DC power converter, used in an electronic apparatus having a subsystem circuit, comprising:
   a first voltage converting circuit electrically connected to the subsystem circuit via an output end, receiving a system voltage and a first reference voltage, and converting the system voltage to a first output voltage based on the first reference voltage;
   a second voltage converting circuit electrically connected to the subsystem circuit through the output end, receiving the system voltage and a second reference voltage, and converting the system voltage to a second output voltage based on the second reference voltage; and
   a reference voltage generating circuit for generating the first reference voltage and the second reference voltage for the first voltage converting circuit and the second voltage converting circuit respectively, wherein the first reference voltage is greater than the second reference voltage by a fixed value;
   wherein the second voltage converting circuit outputs the second output voltage to the subsystem circuit and the reference voltage generating circuit pulls down the second reference voltage by a default value per one time cycle until the second output voltage is a predetermined voltage when the first output voltage at the output end is smaller than a threshold.

2. The DC power converter according to claim 1, wherein the reference voltage generating circuit comprises:
   a first resistor and a second resistor connected serially;
   a first controlled switch connected to the first resistor in parallel; and
   wherein, a high voltage end of the second resistor derives the first reference voltage, and a lower voltage end of the second resistor derives the second reference voltage.

3. The DC power converter according to claim 2, wherein when the first output voltage at the output end being smaller than a threshold, the reference voltage generating circuit pulls down the second reference voltage by a default value per one time cycle until the second output voltage is a predetermined voltage.

4. The DC power converter according to claim 1, wherein the first voltage converting circuit is a buck converter, and the second voltage converting circuit is a low dropout regulator (LDO).

5. The DC power converter according to claim 1, wherein the first voltage converting circuit is a first buck converter, and the second voltage converting circuit is a second buck converter.

6. A mode-switching method used in a DC power converter having a first voltage converting circuit for a high load mode, a second voltage converting circuit for a low load mode, and a reference voltage generating circuit, comprising steps of:
   providing a system voltage, a first reference voltage and a second reference voltage;
   generating and outputting a first output voltage to an output end by the first voltage converting circuit based on the system voltage and the first reference voltage; and
   generating and outputting a second output voltage to an output end by the second voltage converting circuit based on the system voltage and the second reference voltage; wherein, the second voltage converting circuit outputs the second output voltage to an output end of the first voltage converting circuit and the reference voltage generating circuit pulls down the second reference voltage by a default value per one time cycle until the second output voltage is a predetermined voltage when the first output voltage at the output end first voltage converting circuit is smaller than a threshold.

7. The mode-switching method according to claim 6, wherein the first reference voltage is greater than the second reference voltage by a fixed value.

* * * * *